(12) United States Patent
Mackiewicz

(10) Patent No.: US 7,261,190 B1
(45) Date of Patent: Aug. 28, 2007

(54) REACTION LEVER FOR A PARKING BRAKE

(75) Inventor: John Edmund Mackiewicz, Niles, MI (US)

(73) Assignee: Robert Bosch GmbH, Stuttgart (DE)

( * ) Notice: Subject to any disclaimer, the term of this patent is extended or adjusted under 35 U.S.C. 154(b) by 260 days.

(21) Appl. No.: 11/161,944

(22) Filed: Aug. 23, 2005

(51) Int. Cl.
*F16D 51/00* (2006.01)

(52) U.S. Cl. .................... 188/79.55; 188/2 D

(58) Field of Classification Search ............. 188/2 D, 188/72.9, 79.55, 79.57
See application file for complete search history.

(56) References Cited

U.S. PATENT DOCUMENTS

| | | | | |
|---|---|---|---|---|
| 3,064,767 | A * | 11/1962 | Wieger | 188/78 |
| 3,757,908 | A * | 9/1973 | Fisher | 188/265 |
| 4,872,533 | A * | 10/1989 | Boyer et al. | 188/2 D |
| 5,058,713 | A * | 10/1991 | Evans | 188/79.54 |
| 5,180,037 | A | 1/1993 | Evans | |
| 5,360,086 | A | 11/1994 | Charmat | |
| 5,529,149 | A | 6/1996 | Johannesen et al. | |
| 5,553,691 | A * | 9/1996 | Mery et al. | 188/338 |
| 5,630,486 | A * | 5/1997 | Maligne | 188/328 |
| 5,706,914 | A * | 1/1998 | Goldstein | 188/2 D |
| 6,206,148 | B1 * | 3/2001 | Capek et al. | 188/79.51 |
| 6,513,629 | B2 * | 2/2003 | Asai | 188/20 |
| 6,729,449 | B1 * | 5/2004 | Doolittle et al. | 188/340 |
| 6,739,434 | B1 * | 5/2004 | Pontius | 188/2 D |
| 6,742,633 | B1 * | 6/2004 | Sherman et al. | 188/79.64 |
| 6,802,397 | B1 * | 10/2004 | Matteis et al. | 188/2 D |
| 2002/0007990 | A1 * | 1/2002 | Asai et al. | 188/74 |
| 2002/0036123 | A1 * | 3/2002 | Asai et al. | 188/79.51 |
| 2005/0241895 | A1 * | 11/2005 | Peasley | 188/79.55 |
| 2006/0070825 | A1 * | 4/2006 | Fujiyama | 188/2 D |
| 2007/0034461 | A1 * | 2/2007 | Ikeda et al. | 188/205 R |
| 2007/0068743 | A1 * | 3/2007 | Tessitore | 188/2 D |

* cited by examiner

*Primary Examiner*—Devon Kramer
(74) *Attorney, Agent, or Firm*—Leo H. McCormick, Jr.; Sarah Taylor

(57) ABSTRACT

A lever for moving first and second brake shoes into engagement with a drum to effect a brake application. The lever has a first end connected to the brake shoes and a second end with a tine fixed thereto to which a cable is connected to apply an input force to effect a brake application. A predetermined force is applied to the tine to deflect the tine and a tab engages the lever to hold the tine in the deflected position. The tine and second end of the lever move in unison in response to an input force until the input force exceeds the predetermined force such that while the tine and cable continue to move in unison the deflection of the tine proportionally reduces the movement of the first end of the lever and as a result an actuation force applied to effect a brake application is correspondingly reduced.

7 Claims, 2 Drawing Sheets

REACTION LEVER FOR A PARKING BRAKE

This invention relates to a lever through which an input force is applied to move first and second friction pads associated with first and second brake shoes into engagement with a drum to effect a brake application is limited.

BACKGROUND OF THE INVENTION

Disc brakes such as disclosed in U.S. Pat. Nos. 5,180,037 and 5,529,149, have been utilized on rear axles brake systems of vehicles as both a service braking and a parking brake. In such disc brake the service brake is a hydraulically actuated while the parking brake is typically actuated by a lever arrangement. Various lever arrangements have been used to actuate such as a cam mechanism as disclosed in U.S. Pat. No. 5,360,086, a scissors type mechanism as disclosed in U.S. Pat. No. 6,729,449 or a lever as disclosed in U.S. Pat. No. 6,206,148 to supply an input force that moves brake shoes into engagement with a drum to effect a brake application. However, under some circumstances such as moving a vehicle without the release of the parking brake it is possible that a manual input force used to set the parking brake may be excessive and as a result the components of a brake may be damaged.

SUMMARY OF THE INVENTION

The brake assembly of the present invention provides a solution for limiting an actuation force through which a parking brake is actuated in a drum-in-hat brake assembly.

In more particular detail, the brake assembly includes a first and second brake shoes that are retained on a backing plate wherein each of the first and second brake shoes is defined by having a first end and a second end with the first ends aligned with an actuator assembly and the second ends aligned with a spacer. The first and second brake shoes are urged toward the actuator assembly and spacer by a spring arrangement to establish a running clearance between a first friction pad of the first brake shoe and a second friction pad of the second brake shoe with the drum. An input force is applied through the actuator assembly to move the first ends and correspondingly the first and second friction pads into engagement with the drum to effect a brake application. The movement of the first ends of the first and second brake shoes results from an input force applied to a cable pulling on a lever in the actuator assembly to transmit an actuation force to the first ends of the first and second brake shoes. The lever is characterized by a substantially rectangular flat member having a first end and a second end. The first end has a cam surface that is aligned with the first ends of the first and second brake shoes by a pin while a tine is fixed to the second end and the cable attached to the end of the tines. Initially the tine is resiliently deflected with respect to the lever by a predetermined force from an attached position to a rest position and held in the rest position by a tab that engages the lever. With the tine retained in this rest position, the tine and second end of the lever move together in response to the pull of an input force to effect a brake application. When the input force exceeds the predetermined force, the additional input force pulls on and further deflects the tine such that the tine and cable continue to move at a same rate while the movement of the second end is reduced as a function of the further deflection and as a result the actuation force supplied to the first end of the lever for moving the first ends of the first and second brake shoes is correspondingly reduced.

An advantage of the lever of the present invention for use in a parking brake structure of a brake assembly is results in limiting an actuation force that may be applied to move first and second brake pad into engagement with a drum to effect a brake application.

A further distinction of the lever of the invention resided in an ability of a input force being applied in a linear manner to effect a brake application until a predetermined input force is reached and thereafter an increase in an input force is proportionally reduced as a function of the elasticity of a tine through which the input force is transmitted to a lever for moving first and second brake shoes into engagement with a drum.

According to this invention, a parking brake assembly includes a lever having a leaf that extends there from for transmitting an input force from a cable to provide an actuation force for moving of brake shoes into engagement with a drum to effect a brake application wherein the resiliency of the leaf determines the limits of an actuation force that is derived from an input force.

DETAILED DESCRIPTION

Figures 1, 5:
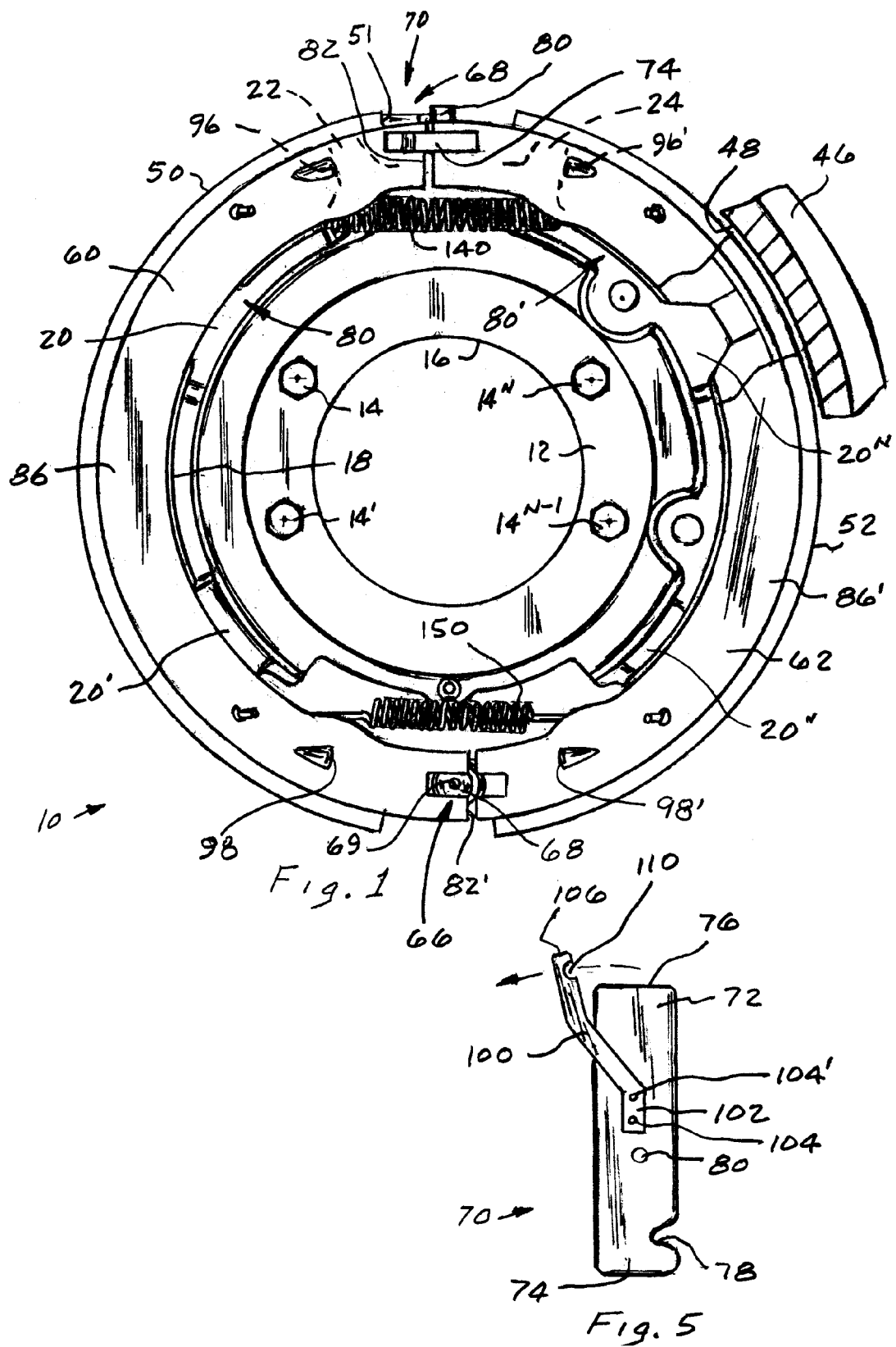
FIG. 1 is a schematic illustration of a portion of a brake assembly that includes an actuation arrangement made according to the principals of the present invention for manually actuating a drum brake.
FIG. 5 is a view of the lever of FIG. 2 when subjected to an actuation force the exceeds a predetermined force.
Figure 2:
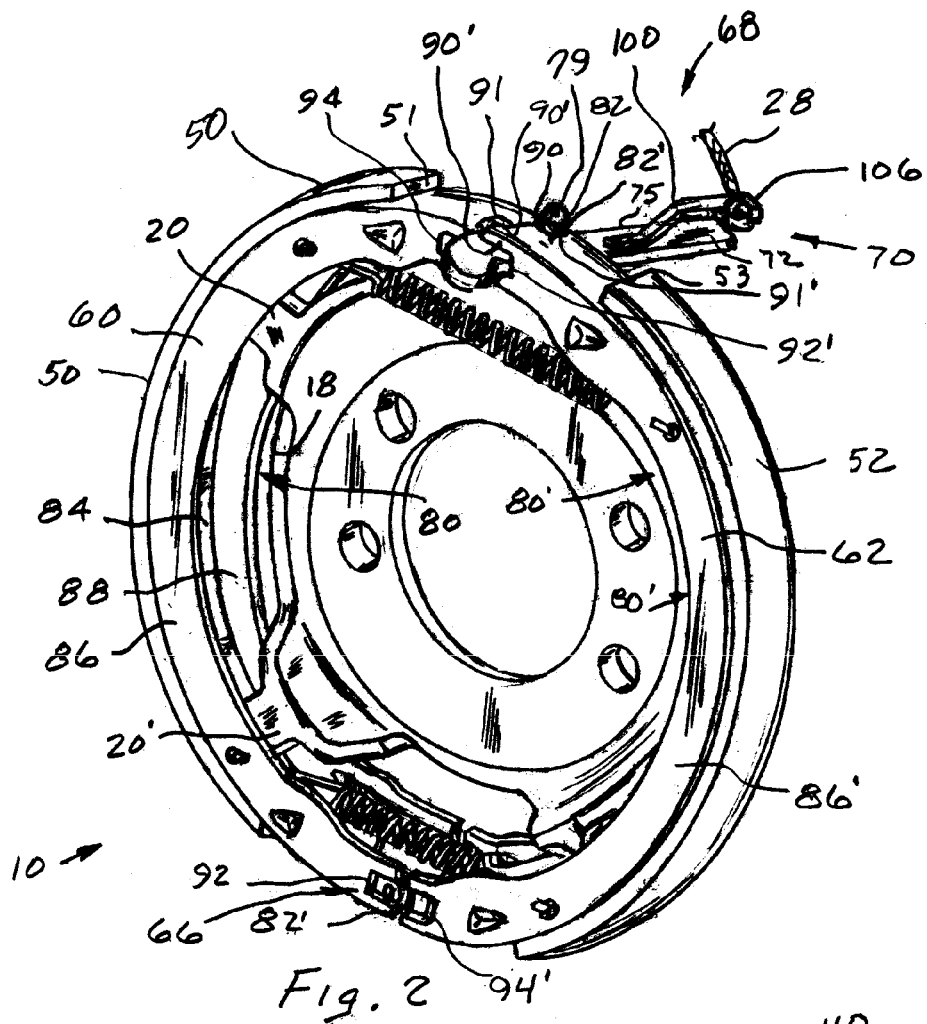
FIG. 2 is a perspective view of the brake assembly and in particular a lever of the actuation arrangement of FIG. 1.

The brake 10, shown in FIGS. 1 and 2, is part of a brake system the functions as a service brake and a parking brake for a vehicle. The parking brake is often referred to as a drum-in-hat and includes a drum 46 that is rotatable about an axis of an axle shaft that has an inner cylindrical surface 48 to define a braking surface for first 50 and second 52 friction surfaces on first 60 and second 62 brake shoes that are manually moved by an actuation arrangement 68, of the present invention, from a position of rest to effect a desired parking brake application.

In more detail, the brake 10 as shown in FIGS. 1 and 2, includes a disc 12 that is fixed by bolts 14, 14' . . . 14" to a vehicle. The disc 12 has an opening 16 therein through which the axle shaft passes and a peripheral surface 18 with a plurality of radial guides 20,20' . . . 20" interspersed between a first radial abutment 22 and a second radial abutment 24 in a manner as illustrated in U.S. Pat. No. 6,729,449. Each radial guides 20,20' . . . 20" is identical and a first portion 20,20' of the plurality receive a first arcuate channel member 80 of the first brake shoe 60 while a second portion 20", 20''' thereof receive a second arcuate channel member 80' of the second brake shoe 62. The radial guides 20, 20' . . . 20" engage the arcuate channels 80, 80' to align the first 50 and second 52 friction surfaces with braking surface 48 on drum 46.

The first and second brake shoes 60 and 62 are identical and each have a U shaped arcuate channel. Channel 80 is herein described with respect to brake shoe 60 but channel 80' of brake shoe 62 has the same features that include a base 84 and first 86 and second 88 sides that extend from a first end 82 to a second end 82'. The base 84 has a first radial indentation 90 located on the first side 88 and a second radial indentation 91 located on the second side 86 adjacent the first end 82 and a complementary first radial indentation located on the second side 88 and a second radial indentation on the first side 86 adjacent the second end 82' with a first reaction surface 96 located adjacent a first end 82 and a second reaction surface 98 located adjacent a second end 82'. End 82 has a complementary shape with respect to end 82' and if they were placed in an abutting situation would match as one end is a reflection of the other end such that either end could be located at the top or bottom of this brake shoe since the slots 92 and 94 are also positioned to receive either the lever 70 of the actuator arrangement 68 or a spacer 66 that functions as an adjuster.

Figure 4:
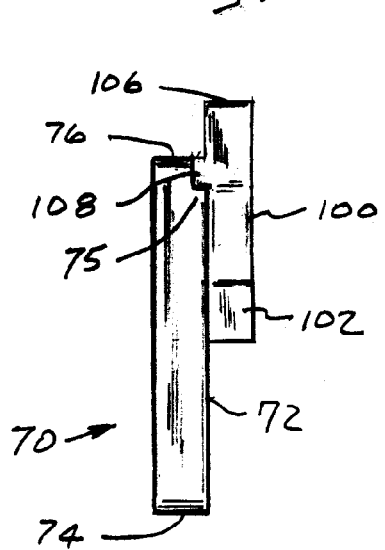
FIG. 4 is a side view of the lever of FIG. 3.
Figure 3:
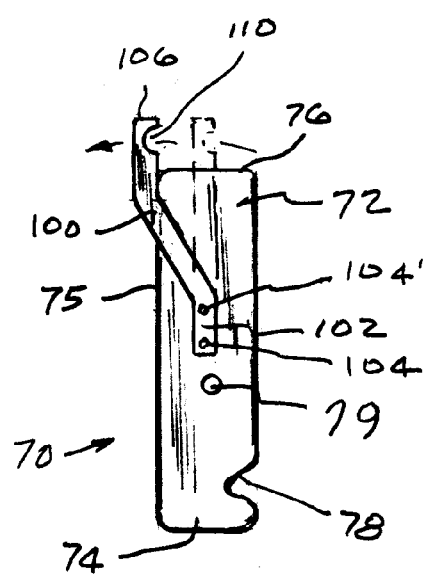
FIG. 3 is a top view of the lever used in FIG. 2.

The actuator arrangement 68 includes a lever 70 and a cable 28 with the lever 70 being defined by a substantially rectangular flat member 72 with a first end 74 and a second end 76. A cam surface 78 is located adjacent the first end 74 a fixed distance from a pin 79 while a first end 102 of a tine or leaf member 100 that is fixed to the lever 70 by rivets 104, 104'. The tine or leaf member 100 has a second end 106 to which a predetermined force is applied after the first end 102 is riveted to the lever 70 to resiliently deflect the second end 106 from an initial position shown by the dashed lines in FIG. 3 to a position of rest. The tine or leaf member 100 is held in this position of rest by the engagement of a tab 108 with surface 75 adjacent the second end 76 as shown in FIG. 4. The tine or leaf 100 is made of a difference material than the lever 70 and as a result the tine 100 has a different modulus of elasticity such that it may flex and return to an original shape without any permanent set. The tine or leaf member 100 has a hook 110 on the free end 106 to which the actuation cable 28 is attached after the lever 70 is respectively located in abutting linear slots 92', 94 and 92, 94' in channels 80 and 80' such that pin 79 is retained between the first indentation 90 on brake shoe 60 and indentation 91' on brake shoe 62.

The spacer 66 is of a type disclosed in U.S. Pat. No. 6,729,449 that is located inside of the U-shaped channels 80, 80' to connect the second end of the first brake shoe 60 with the second end of the second brake shoe 62. The spacer 66 includes a wedge member 68 to which a nut 69 is attached that may be turned to adjust the distance between the first 50 and second 52 friction surfaces and drum 46.

After the U-shaped channels 80,80' are placed on the radial guides and spacer 66 and lever 70 are respectively placed on the ends thereof, a first spring 140 and a second 150 spring are attached to wall 86 of the first arcuate channel 80 and to wall 86' of the second arcuate channel 80' to urge the first ends 82,82' thereon toward the first 22 and second 24 radial abutments and the second ends 82', 82 toward the spacer 100 to complete the assembly of the first 60 and second 62 brake shoes on the disc 12.

MODE OF OPERATION

For purposes of describing the functional relationship of the components of the parking brake function of the brake 10 during a brake application it is assume that drum 46 is turning in a counter clockwise direction.

To initiate a brake application, an input force is applied to a lever 70 that is located in the first 94,92' and second 92,94' linear slots in the first 86 and second 88 sides of the arcuate channels 80,80' such that lever 70 pivots about pin 79. Movement of the hooked end 106 of lever 70 causes cam surface 78 to engage the first end 82 of arcuate channel 80' and as a result the first ends 82, 82' of channels 80, 80' moves such that the reactions surfaces 96, 96' on arcuate channel 80 to move away from the first radial abutment 22 and the reaction surfaces 96, 96' on arcuate channel 80' to move away from the second radial abutment 24. When a leading edge 51 on the first friction surface 50 engages braking surface 48, the first channel 80 and second channel 80' will rotate together as a unit in the same counter clockwise direction such that the first reaction surface 96,96' on arcuate channel 80 continues to move away from the first radial abutment 22 while the first reaction surface 96,96' on arcuate channel 80' associated with a trailing edge 53 of friction surface 52, is now is returned to engagement with the second radial abutment 96,96' to oppose a force generated through the engagement of the first 50 and second 52 friction surfaces with the braking surface 48 in opposing the rotation of drum 46 to effect a brake application. The plurality of radial guides 20,20' . . . 20n engage the side walls 86,88 on the arcuate channels 80,80' to maintain a perpendicular and axial alignment between the first 50 and second 52 friction surfaces with the braking surface 48 during a brake application and as a result uniform wear is achieve on the first 50 and second 52 friction surfaces.

The input force from cable 28 is transmitted through tine or leaf 100 into the lever 70 as a pulling force such that the tine 100 and second end 76 of the lever move in unison to deliver an actuation force to the first end 74 of the lever 70. The actuation force is a linear function of the input force until the input force equals a predetermined force which equals the force required to deform or deflect the tine 100 from an installed position into its rest position shown in FIG. 3. Once this predetermined force is applied by cable 28 to pull tine 100 any additional input or pull force will thereafter proportionally deflects the tine 100 with respect to the second end 76 of the lever in a manner as illustrated in FIG. 5. Thus, the movement of the lever 70 is reduced as a function of such deflection and the actuation force delivered to the first end 74 for moving the first ends 82, 82' of the brake shoes 60 and 62 is thereafter correspondingly reduced in effecting a brake application.

What is claimed is:

1. A brake assembly having first and second brake shoes that are retained on a backing plate with each of the first and second brake shoes having a first end and a second end wherein the first ends are aligned with an actuator assembly and the second ends are spaced apart by a spacer mechanism and spring means for urging the first and second brake shoes toward the actuator assembly and the adjuster mechanism to maintain a predetermined running clearance between a first friction pad of the first brake shoe and a second friction pad of the second brake shoe and a drum such that an input force applied to the actuator assembly moves the first ends and correspondingly the first and second friction pads associated with the first and second brake shoes into engagement with said drum to effect a brake application, the movement of the first ends resulting from an actuation force derived from an input force applied to a cable pulling on a lever of the actuator assembly, said lever being characterized by a first end that is connected to the first ends of said first and second brake shoes and a second end, a tine attached to the second end to which the cable is connected, said tine being resiliently deflected with respect to said second end by a predetermined force such that a tab on the tine engages said lever, said input force is transmitted through said tine and into the lever such that the tine and second end move in unison to deliver an actuation force to the first end of the lever until the input force equals a predetermined force and any additional input force thereafter proportionally deflects the tine with respect to the second end such that movement of the lever is reduced as a function of the deflection of said tine and as a result the actuation force delivered to said first ends to effect said brake application is correspondingly reduced.

2. The brake assembly as recited in claim 1 wherein the movement of said tine, cable and second end is linear until said predetermined force deflects said tine and thereafter movement of the second end of the lever is reduced even though the tine and cable continue to move at a same rate.

3. The brake assembly as recited in claim 2 wherein the lever is made of a first material and said tine is made of a second material with the tine having a lower modulus of elasticity such that the tine deflects with respect to said second end.

4. A brake assembly having first and second brake shoes that are retained on a backing plate with each of the first and second brake shoes having a first end and a second end wherein the first ends are aligned with an actuator assembly and the second ends are aligned with a spacer and spring means for urging the first and second brake shoes toward the actuator assembly and said spacer to maintain a predetermined running clearance between a first friction pad of the first brake shoe and a second friction pad of the second brake shoe and a drum such that an input force applied to the actuator assembly moves the first ends and correspondingly the first and second friction pads associated with the first and second brake shoes into engagement with said drum to effect a brake application, the movement of the first ends of the first and second brake shoes resulting from an input force being applied to a cable to pull a lever and deliver an actuation force to the first ends of the first and second brake shoes, said lever being characterized by a substantially rectangular member with a first end and a second end, said first end being connected to the first ends of the first and second brake shoes, a tine fixed to said lever adjacent said second end to which the cable is connected, said tine being resiliently deflected with respect to said second end by a predetermined force such that a tab on the tine engages the lever and as a result said tine and second end move together in response to the pull of the input force until the input force equals a predetermined force and any additional input force pulls on and deflects the tine such that the tine and cable move at a same rate while movement of said second end is reduced as a function of the deflection of said time and as a result the actuation force supplied to the first end of the lever for moving the first ends of the first and second brake shoes is correspondingly reduced.

5. The brake system as recited in claim 4 wherein said tine is riveted to said lever and has a different modulus of elasticity than the lever.

6. The brake system as recited in claim 4 wherein said deflection of said tine limits the actuation force that may be applied to effect a brake application.

7. The brake system as recited in claim 4 wherein said tine is an integral component of said lever.

* * * * *